US011715939B2

(12) United States Patent
Kang et al.

(10) Patent No.: US 11,715,939 B2
(45) Date of Patent: Aug. 1, 2023

(54) DISTRIBUTING BOARD HAVING POSITION LOCK DEVICE

(71) Applicant: LS ELECTRIC CO., LTD., Anyang-si (KR)

(72) Inventors: Hanyoung Kang, Anyang-si (KR); Minsoo Son, Anyang-si (KR); Seogwon Lee, Anyang-si (KR); Kilyoung Ahn, Anyang-si (KR); Younggeun Kim, Anyang-si (KR)

(73) Assignee: LS ELECTRIC CO., LTD., Anyang-si (KR)

(*) Notice: Subject to any disclaimer, the term of this patent is extended or adjusted under 35 U.S.C. 154(b) by 127 days.

(21) Appl. No.: 17/602,931

(22) PCT Filed: Mar. 17, 2020

(86) PCT No.: PCT/KR2020/003637
§ 371 (c)(1),
(2) Date: Oct. 11, 2021

(87) PCT Pub. No.: WO2020/209515
PCT Pub. Date: Oct. 15, 2020

(65) Prior Publication Data
US 2022/0181854 A1    Jun. 9, 2022

(30) Foreign Application Priority Data

Apr. 11, 2019 (KR) .......................... 10-2019-0042655

(51) Int. Cl.
*H02B 11/133* (2006.01)
*H02B 1/36* (2006.01)

(52) U.S. Cl.
CPC ............. *H02B 11/133* (2013.01); *H02B 1/36* (2013.01)

(58) Field of Classification Search
CPC ................................. H02B 11/133; H02B 3/00
See application file for complete search history.

(56) References Cited

U.S. PATENT DOCUMENTS

| 2,273,001 A | * | 2/1942 | Mahoney | H02B 11/133 361/609 |
| 4,743,715 A | * | 5/1988 | Gerbert-Gaillard | H02B 11/133 200/50.26 |

(Continued)

FOREIGN PATENT DOCUMENTS

| JP | 08-242512 | 9/1996 |
| JP | 0824512 | 9/1996 |

(Continued)

OTHER PUBLICATIONS

International Search Report for related International Application No. PCT/KR2020/003637; report dated Oct. 15, 2020; (6 pages).

(Continued)

*Primary Examiner* — Robert J Hoffberg
(74) *Attorney, Agent, or Firm* — K&L Gates LLP

(57) ABSTRACT

The present disclosure relates to a distributing board having a position lock device and, more specifically, having a position lock device which can hold or release, at a specific position, an electric power device unit. The distributing board having a position lock device, according to one embodiment of the present disclosure, comprises an external case and an electric power device unit drawn into and out of the external case, and further comprises: a position setting bracket which is fixed to the external case and has convex-concave parts for setting the position of the electric power device unit; and a lock device which moves with the electric power device unit by being coupled to a portion of the electric power device unit, and which restricts or allows movement of the electric power device unit by being hooked (Continued)

into or released from the positions of the position setting bracket.

14 Claims, 21 Drawing Sheets

(56) References Cited

U.S. PATENT DOCUMENTS

| | | | | |
|---|---|---|---|---|
| 4,860,161 A | * | 8/1989 | Maki | H02B 11/133 361/615 |
| 5,087,104 A | | 2/1992 | Fursier et al. | |
| 5,206,468 A | * | 4/1993 | Kobayashi | H02B 11/133 361/606 |
| 5,309,317 A | * | 5/1994 | Ishikawa | H05K 7/1421 200/325 |
| 6,028,272 A | * | 2/2000 | Akers | H02B 11/133 200/50.21 |
| 9,899,809 B2 | | 2/2018 | Son | |
| 2017/0250526 A1 | | 8/2017 | Choi | |

FOREIGN PATENT DOCUMENTS

| | | | |
|---|---|---|---|
| KR | 2019950025972 U | 9/1995 | |
| KR | 100303591 B1 * | 11/2001 | ........... H02B 11/133 |
| KR | 20120020658 A | 3/2012 | |
| KR | 101143817 B1 | 5/2012 | |
| KR | 20130026748 A | 3/2013 | |
| KR | 101352593 B1 | 1/2014 | |
| KR | 101403513 B1 | 6/2014 | |
| KR | 101528602 B1 | 6/2015 | |
| KR | 20150086066 A | 7/2015 | |
| KR | 101630678 B1 | 6/2016 | |
| KR | 101708020 B1 | 2/2017 | |
| WO | 2013043530 A1 | 3/2013 | |

OTHER PUBLICATIONS

Written Opinion for related International Application No. PCT/KR2020/003637; report dated Oct. 15, 2020; (3 pages).

* cited by examiner

DISTRIBUTING BOARD HAVING POSITION LOCK DEVICE

CROSS-REFERENCE TO RELATED APPLICATIONS

This application is the National Stage filing under 35 U.S.C. 371 of International Application No. PCT/KR2020/003637, filed on Mar. 17, 2020, which claims the benefit of earlier filing date and right of priority to Korea utility model Application No. 10-2019-0042655 filed on Apr. 11, 2019, the contents of which are all hereby incorporated by reference herein in their entirety.

FIELD

The present disclosure relates to distributing board having a position locking (or lock) device, and more particularly, a distributing board having a position locking device that can allow an electric device unit configured to be drawn in or drawn out to be locked or unlocked to or from a specific position.

BACKGROUND

In general, a distributing board (distributing panel, control center) is a component of an electricity supply system that receives power to supply required power by load equipment installed in each electric power consumer. The distributing board can distribute power by converting high-voltage power into low-voltage power. Various electric devices such as a switchgear, a lightning arrester, a transformer, and a circuit breaker may be provided in the distributing board.

A high-voltage distributing board, a low-voltage distributing board, and a motor control center (MCC) are examples of the distributing board.

The MCC is a system that safely protects load devices related to motors installed in various types of industrial equipment. The distributing board can distribute low-voltage electricity supplied from a transformer to a motor, and serves to monitor and interrupt (or block) the flow of overcurrent.

As for the distributing board, a unit in which multiple electric control devices are accommodated (hereinafter, referred to as an "electric device unit") may be installed in a cabinet (e.g., a steel enclosure). Here, the electric device unit may be installed to be attachable and detachable (draw in and draw out, withdrawable) to and from the cabinet for maintenance. In addition, the distributing board may include a busbar installed therein for supplying electricity, and the electric device unit may be implemented as a movable drawer to be connected to the busbar.

FIG. 1 is a front view of a distributing board of the related art, and FIG. 2 is a top view of an electric device unit.

Referring to FIG. 1, a plurality of electric device units 2 are installed at a cabinet 1 in multiple layers.

A distributing board is configured such that a plurality of storage units are implemented as a drawer type to be drawn in and out as illustrated in FIG. 1. As these units are configured to be drawn in and out, primary and secondary (or first and second) sides of a circuit breaker and a connector accommodated in the unit are separated to thereby cause electrical disconnection.

The electric device unit 2 is configured as follows. The electric device unit 2 includes a storage box 3 implemented as a drawer, a first connector 4 and a second connector 5 that are installed on a rear side of the storage box 3, a circuit breaker 6 or relay installed between the first connector 4 and the second connector 2, a current transformer (CT), an indicator lamp 7, and an operation switch 8. The function of this structure is related to safety, maintenance management, etc.

A position of the electric device unit 2 in the cabinet 1 can be classified as follows. A service position in which the first and second connectors constructing a main circuit are connected, and a test position in which the first and second connectors are separated and only a control circuit socket (not shown) is connected, a disconnect position in which the main circuit and the control circuit are disconnected, and a withdrawal position in which the main circuit and the control circuit are disconnected and the electric device unit 2 is separated from the cabinet 1.

In order to enable movement between each position, the electric device unit 2 is drawn in and out by using a tool such as a handle. Movement to and from each position is enabled by a moving tool (e.g., a screw gear (not shown)) in the electric device unit 2.

In the distributing board according to the related art, the electric device unit 2 is moved in and out of each position by inserting a handle into a screw gear to turn it clockwise or counterclockwise. However, position locking for each position is not allowed, causing the electric device unit 2 to be located in between two positions. In addition, when the handle is used even after the electric device unit 2 is located in the service position, it may cause damage to internal components such as a screw gear due to overload.

SUMMARY

The present disclosure is directed to solving the above problems, and the present disclosure describes a distributing board having a position locking (or lock) device that can allow an electric device unit configured to be drawn in and out to be locked or unlocked (or released) to or from a specific position.

According to one aspect of the subject matter described in this application, a distributing board having a position lock device includes an enclosure and an electric device unit configured to be drawn in and out of the enclosure. The distributing board having the position lock device further includes a positioning bracket having a concave and convex part fixed to the enclosure and configured to set a position of the electric device unit, and a locking device coupled to a portion of the electric device unit to move together with the electric device unit and configured to be locked or unlocked to or from each position of the positioning bracket so as to inhibit or allow movement of the electric device unit.

Implementations according to this aspect can include one or more of the following features. For example, the concave and convex part may include a plurality of convex portions and concave portions formed alternately. The plurality of convex portions and concave portions may include a first convex portion, a first concave portion, a second convex portion, a second concave portion, a third convex portion, and a third concave portion sequentially formed from one end of the positioning bracket. The first concave portion, the second concave portion, and the third concave portion may correspond to a disconnect position, a test position, and a service position of the electric device unit, respectively.

In some implementations, adjacent convex and concave portions of the plurality of convex portions and concave portions may be connected by an inclined surface.

In some implementations, the positioning bracket may be provided with a plurality of coupling holes through which the positioning bracket is coupled to a panel or frame of the enclosure.

In some implementations, an entry portion may be provided at one end of the positioning bracket in an inclined manner.

In some implementations, a test position locking groove corresponding to the test position and a service position locking groove corresponding to the service position may be formed on an upper surface of the positioning bracket.

In some implementations, the locking device may include: a case; an upper locking member installed at the case to be movable up and down, so as to slide along an upper surface of the positioning bracket when the electric device unit is drawn in and out of the enclosure; a lower locking member rotatably installed at the case to slide along a lower surface of the positioning bracket when the electric device unit is drawn in and out of the enclosure; and a release plate installed on the case to move linearly in a direction orthogonal to a movement direction of the upper locking member, so as to release locking of the upper locking member.

In some implementations, the locking device may further include an operation member that provides a force for operating the release plate.

In some implementations, operation holes may be formed on upper and lower surfaces of the case, respectively, so as to allow a portion of the upper locking member to move up and down.

In some implementations, an indicator hole having an arcuate shape may be formed on a side surface of the case.

In some implementations, the upper locking member may include a body plate having a vertical portion and a horizontal portion; a spring hole defined in the vertical portion; a first spring installed in the spring hole; a stopping portion protruding from a portion of the vertical portion; and a locking protrusion fixed to a portion of the horizontal portion.

In some implementations, the first spring may have an upper end portion caught on an upper surface of the case to provide an elastic force for causing the upper locking member to move downward.

In some implementations, a first stopping protrusion that limits movement of the lower locking member or the upper locking member may be provided at one side of the vertical portion in a protruding manner.

In some implementations, upper and lower grooves may be respectively formed on upper and lower portions of the vertical portion adjacent to the first stopping protrusion.

In some implementations, the lower locking member may include a stopping plate, a rotating shaft provided at one portion of the stopping plate, and an indicator provided at another portion of the stopping plate.

In some implementations, the stopping plate may be formed as a flat plate having a first corner, a second corner, and a third corner. A second stopping protrusion that is brought into contact with or separated from the first stopping protrusion and the rotating shaft that serves as a rotation center of the lower locking member may be provided at the first corner.

In some implementations, a spring fixing hole in which a second spring providing an elastic force for causing the lower locking member to move upward may be formed at the second corner.

In some implementations, a lift prevention portion that limits upward movement of the lower locking member may be formed at the third corner.

In some implementations, one end portion of the release plate may be bent to define a coupling portion to which the operation member is coupled.

In some implementations, another end of the release plate may extend to define an extended portion.

In some implementations, a release portion formed as an inclined surface may be provided on an upper surface of the release plate so that the upper locking member is moved upward when the release portion is brought into contact with the stopping portion.

In some implementations, an insertion groove may be formed on the upper surface of the release plate adjacent to the release portion to prevent interference of the stopping portion.

In some implementations, a stopper that limits downward movement of the stopping plate may be provided at one side of the extended portion in a protruding manner.

In some implementations, a spring mounting portion at which one end of the second spring is installed may be provided at another side of the extended portion in a protruding manner.

In some implementations, the operation member may include a push button exposed to an outside of a front door of the electric device unit to be pressed by a user, and a transmission member coupled between the push button and the coupling portion to transmit a force.

In a distributing board having a position lock device according to implementations of the present disclosure, an electric device unit can be locked or unlocked (released) to or from a set position, such as a test position and a service position, allowing stable operation to be enabled.

In addition, incomplete connection due to non-driving or damage to parts due to over-driving can be prevented.

As a sound is generated by contact of locking protrusions when there is a change in position or locking is released, a change in position can be audibly recognized.

As a position of an indicator is sensed and displayed externally, a position of the electric device unit can be easily recognized.

BRIEF DESCRIPTION OF THE DRAWINGS

FIG. 5 illustrates a connect position, FIG. 6 illustrates a test position, FIG. 7 illustrates a disconnect position, and FIG. 8 illustrates a withdrawal position.

FIG. 12 illustrates a withdrawal position, FIGS. 13 and 14 illustrate a state of entering (moving) between the withdrawal position and a disconnect position, FIG. 15 illustrates a disconnect position, FIG. 16 illustrates a state of entering (moving) between the disconnect position and a test position, FIG. 17 illustrates a state of being locked to the test position, FIG. 18 illustrates a state of being released (unlocked) from the test position, FIG. 19 illustrates a state of entering (moving) between the test position and a service position, FIG. 20 is a state of being locked to the service position, and FIG. 21 illustrates a state of being released from the service position.

DETAILED DESCRIPTION

Hereinafter, preferred implementations of the present disclosure will be described with reference to the accompanying drawings, so that a person skilled in the art can easily carry out the disclosure. It should be understood that the technical idea and scope of the present disclosure are not limited to those preferred implementations.

Figure 1:
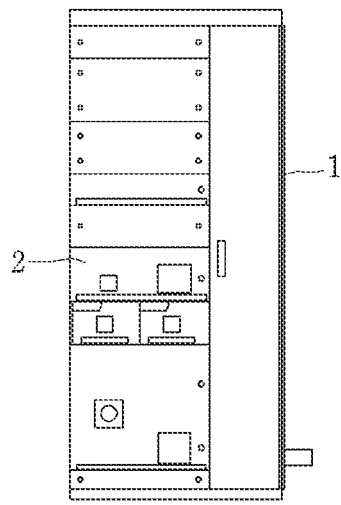
FIG. 1 is a front view of a distributing board according to the related art.
Figure 2:
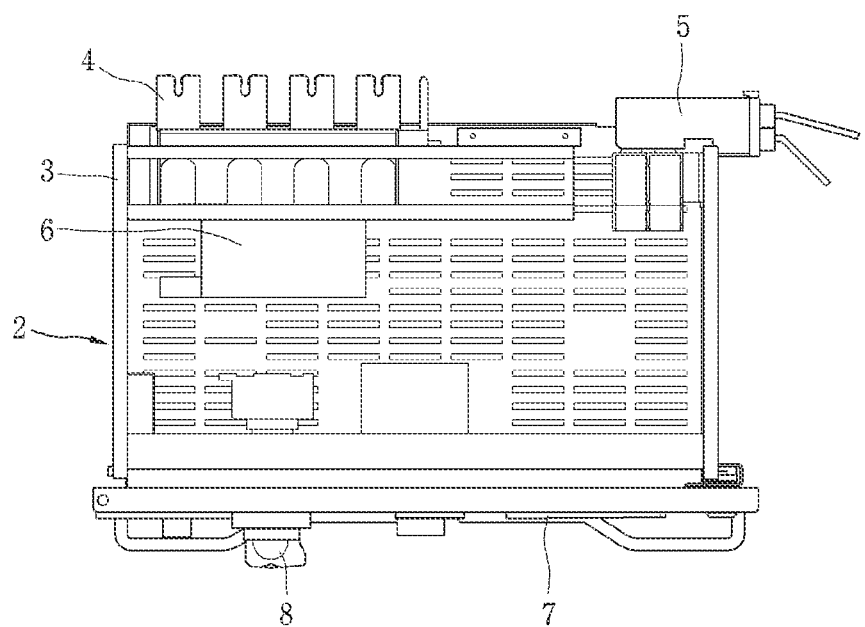
FIG. 2 is a top view of an electric device unit according to the related art.
Figure 3:
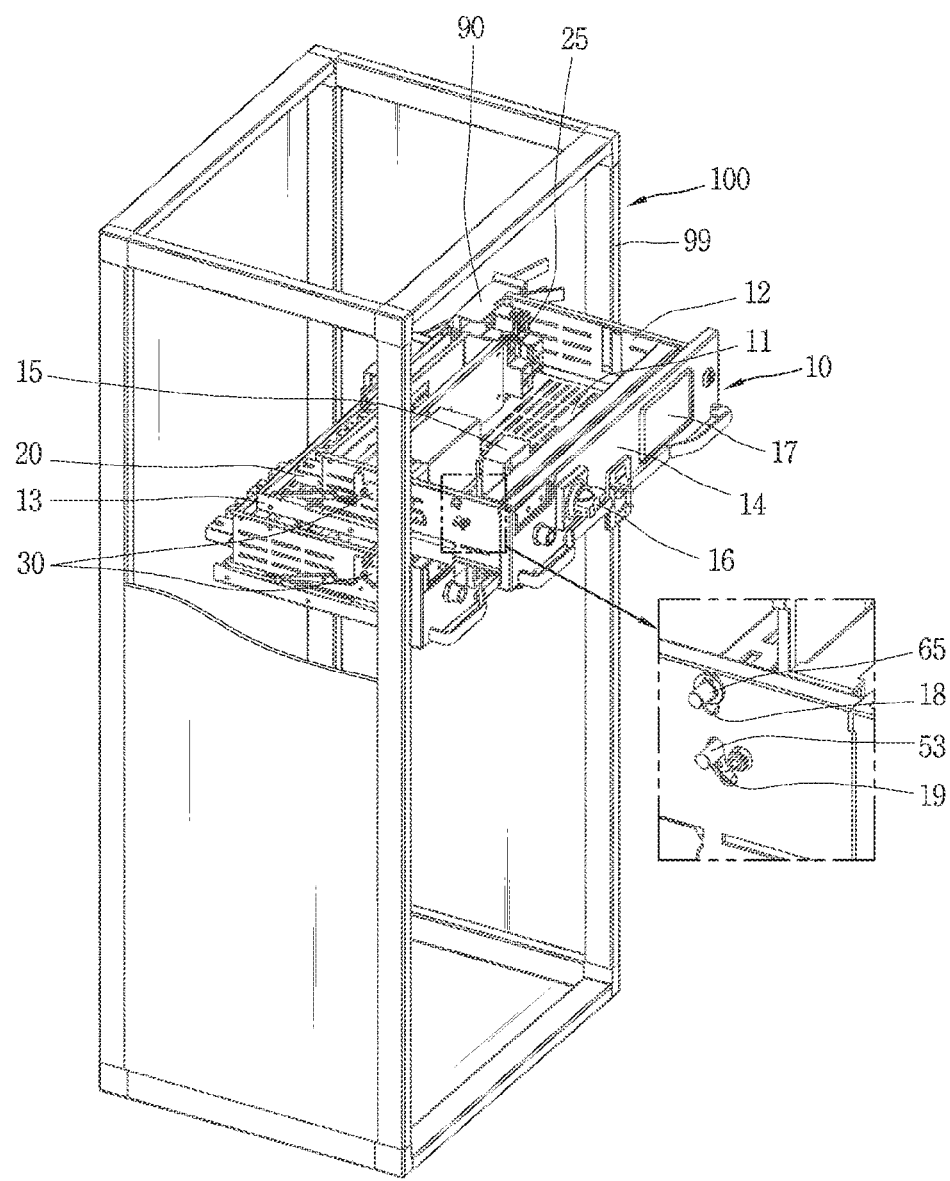
FIG. 3 is a perspective view of a distributing board according to an implementation of the present disclosure, viewed from a front lateral direction.
Figure 4:
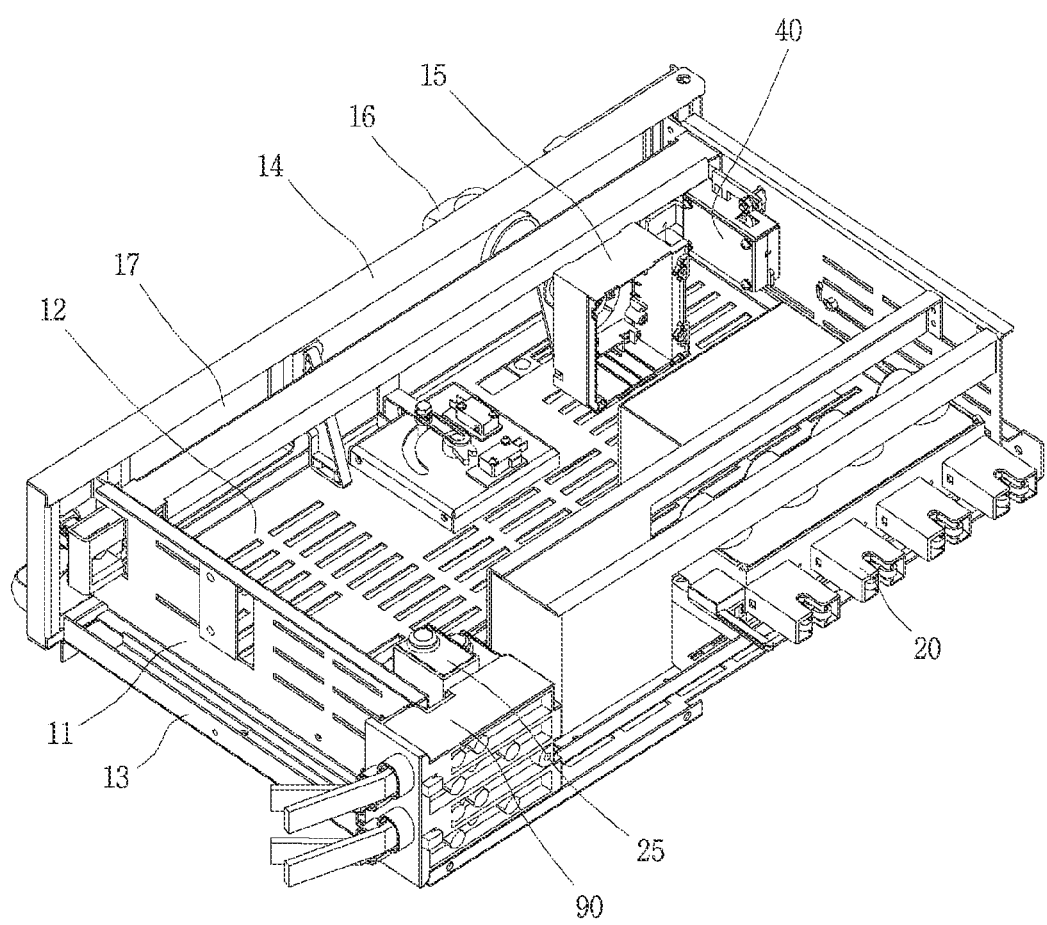
FIG. 4 is a perspective view of an electric device unit applied to FIG. 3, viewed from a rear lateral direction.

A distributing board having a position locking (or lock) device according to implementations of the present disclosure will be described in detail with reference to the drawings. FIG. 3 is a front-lateral perspective view of a distributing board according to an implementation of the present disclosure, and FIG. 4 is a rear-lateral perspective view of an electric device unit applied to FIG. 3.

A distributing board having a position locking device according to an implementation of the present disclosure includes an enclosure (or external case) 100, an electric device unit 10 configured to be drawn in and out of the enclosure 100, a positioning bracket (or position setting bracket) 30 having a concave and convex part fixed to the enclosure 100 to set a position of the electric device unit 10, and a locking (or lock) device 40 that is coupled to a portion of the electric device unit 10 to move together with the electric device unit 10 and is configured to be locked or unlocked (or released) to or from each position of the positioning bracket 30 so as to inhibit or allow movement of the electric device unit 10.

The distributing board includes the enclosure 100 (also referred to as a cabinet or a storage box) configured as a deck and a plurality of electric device units 10 insertedly installed at the enclosure 100 in parallel (in multiple layers).

The enclosure 100 may be provided with a frame 99 made of iron or the like to support the enclosure 100.

The enclosure 100 may include shelves on which the respective electric device units 10 are placed and rails for guiding the entry and exit of the electric device units 10. However, for the sake of understanding of the drawing, specific components in the enclosure are not illustrated in FIG. 3.

The positioning bracket 30 is fixed to a panel or frame 99 of the enclosure 100.

The electric device unit 10 is manufactured such that a plurality of units can be insertedly installed at the enclosure 100 in parallel. The electric device unit 10 is formed in the form of a box or drawer to be drawn in and out of the enclosure 100. The electric device unit 10 may be configured such that electric devices or components are installed in a unit frame 11. Examples of such an electric device unit may include a MCC unit, a circuit breaker unit, a switch unit, and the like.

The unit frame 11 may have a box shape with top and front surfaces open. The unit frame 11 defines the enclosure of the electric device unit 10. Electric devices such as a circuit breaker 15 and a surge protector (not shown) may be installed in the unit frame 11. In the drawings, for the sake of understanding, only some of the electric devices installed in the unit frame 11 are depicted, and cables (conducting wires) are not illustrated.

A long hole through which some components of the locking device 40 can be installed in a penetrating manner to be operated is formed on one side of the unit frame 11. The long hole includes a straight hole 18 through which a locking protrusion 65 is exposed to be movable up and down and an arcuate hole 19 through which an indicator 53 is exposed to be rotatably moveable.

A base plate 12 is provided on a lower surface of the unit frame 11. Rail frames 13 are provided on both sides of the base plate 12 so as to allow the electric device unit 10 to be drawn in and out of an individual deck of the enclosure 100 in a sliding manner.

A front door 14 is rotatably installed on a front surface of the unit frame 11. The front door 14 may be opened by being hinged to one side of the unit frame 11.

A circuit breaker handle (handle for circuit breaker) 16 through which the circuit breaker 15 is manipulated from the outside, a board plate 17 of a lamp board, and the like may be installed at the front door 14. In addition, a handle (not shown) for withdrawal is provided at a portion of the front door 14.

A first connector (first moving connector) 20 that is connected to a main bus 95 (see FIG. 5) and a second connector (second moving connector) 25 that is connected to a main circuit are installed at a rear surface of the unit frame 11. Here, each of the connectors may also be referred to as a plug or a clip.

The enclosure 100 is provided with a second fixed connector 90. When the electric device unit 10 is drawn in the enclosure 10 to be located in the service position, the first connector 20 is connected to the main bus 95, and the second connector 25 is coupled to the second fixed connector 90, allowing the main circuit to conduct current.

Figure 5:
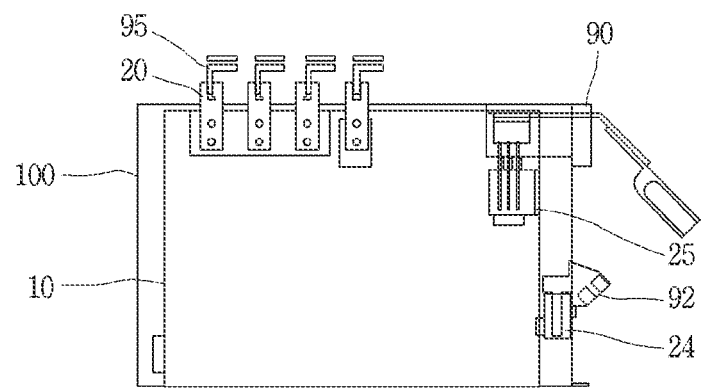
FIGS. 5 to 8 are views illustrating different positions of an electric device unit according to an implementation of the present disclosure.
Figure 6:
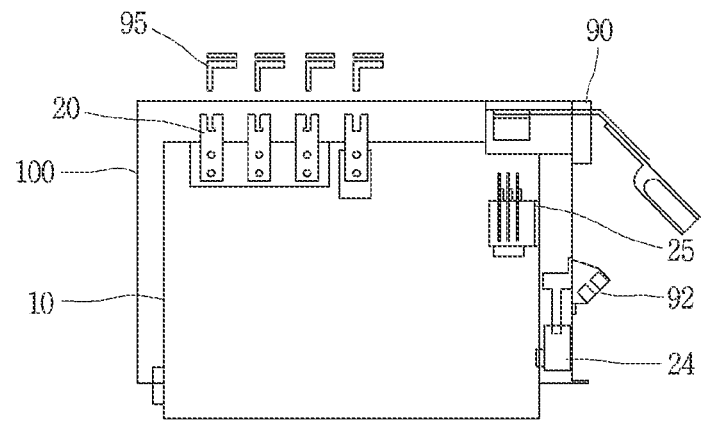
Figure 7:
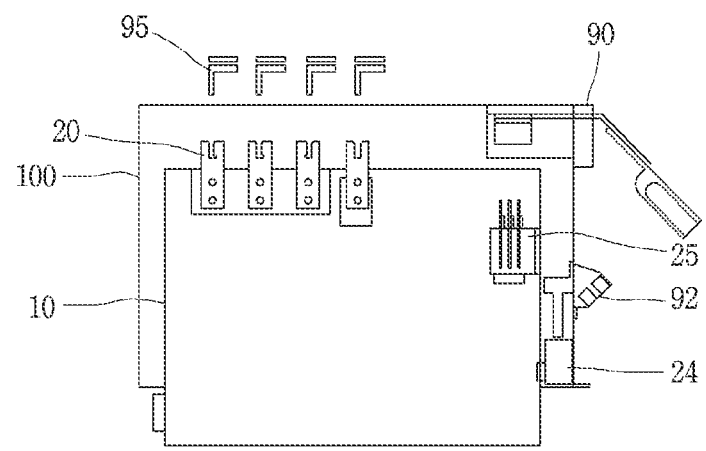
Figure 8:
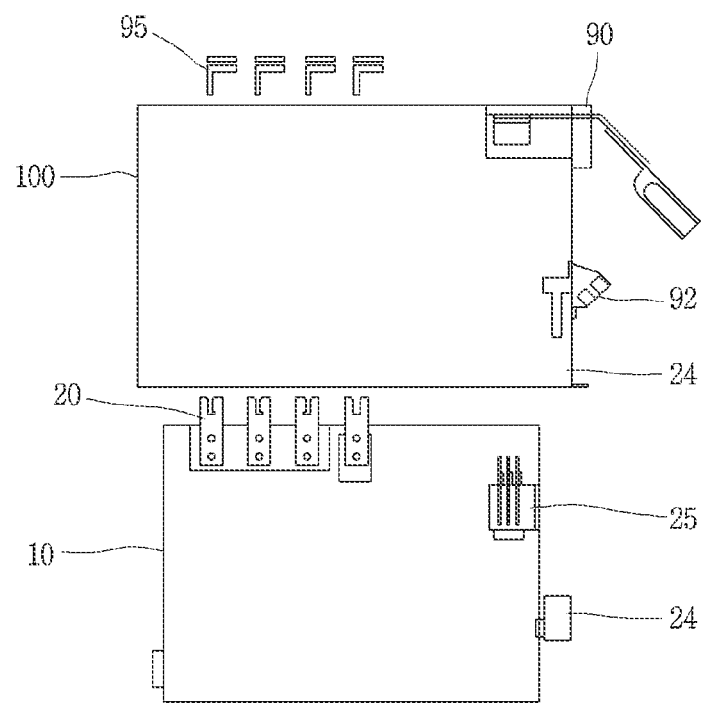

FIGS. 5 to 8 are views illustrating different positions of an electric device unit according to an implementation of the present disclosure. FIG. 5 represents a service position (also referred to as a connect position), FIG. 6 represents a test position, and FIG. 7 represents a disconnect position (also referred to as an interrupt position, a break position, or a cut off position), FIG. 8 represents a withdrawal position. Meanwhile, the term "state" may be used instead of, or interchangeably with, the term "position". For example, the service position may also be referred to as the service state.

In the service position, the first connector 20 is connected to the main bus 95, and the second (moving) connector 25 is connected to the second fixed connector 90. In addition, a control circuit socket (socket for control circuit) 24 installed in the electric device unit 10 and a control circuit plug (plug for control circuit) 92 installed on the enclosure 100 are connected to each other. Accordingly, the main circuit is connected to the main bus to allow current to flow.

In the test position, the first connector 20 and the second moving connector 25 are separated from the main bus 95 and the second fixed connector 90, respectively, so that the electrical connection of the main circuit is cut off. However, the control circuit socket 24 and the control circuit plug 92 are in the connected state. Thus, on/off tests are available.

In the disconnect position, the first connector 20 and the second moving connector 25 are separated from the main bus 95 and the second fixed connector 90, respectively, so that the electrical connection of the main circuit is shut off. Also, the control circuit is cut off as the control circuit socket 24 is separated from the control circuit plug 92. That is, the electric device unit 10 is electrically disconnected from the distributing board.

In the withdrawal position, the electric device unit 10 is completely separated from the enclosure 100 of the distributing board. That is, electrical and mechanical connection (coupling) of the electric device unit 10 to the distributing board is cut off (the electric device unit 10 is electrically and mechanically disconnected from the distributing board).

Figure 9:
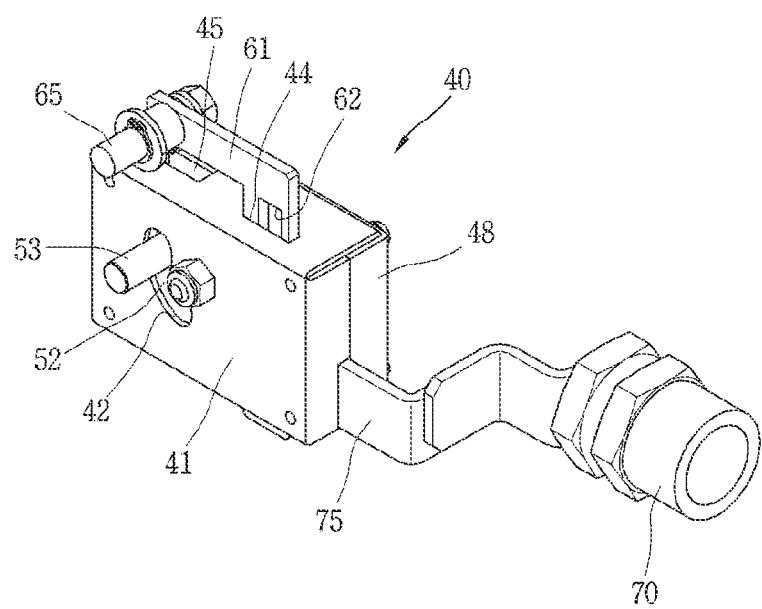
FIGS. 9 and 10 are perspective views of a locking device and a positioning bracket used in an electric device unit according to an implementation of the present disclosure.
Figure 10:
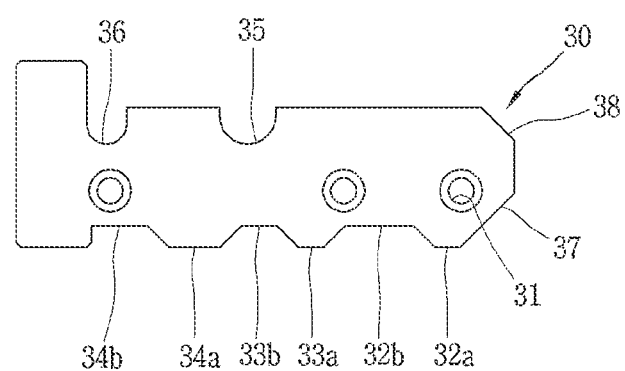
Figure 11:
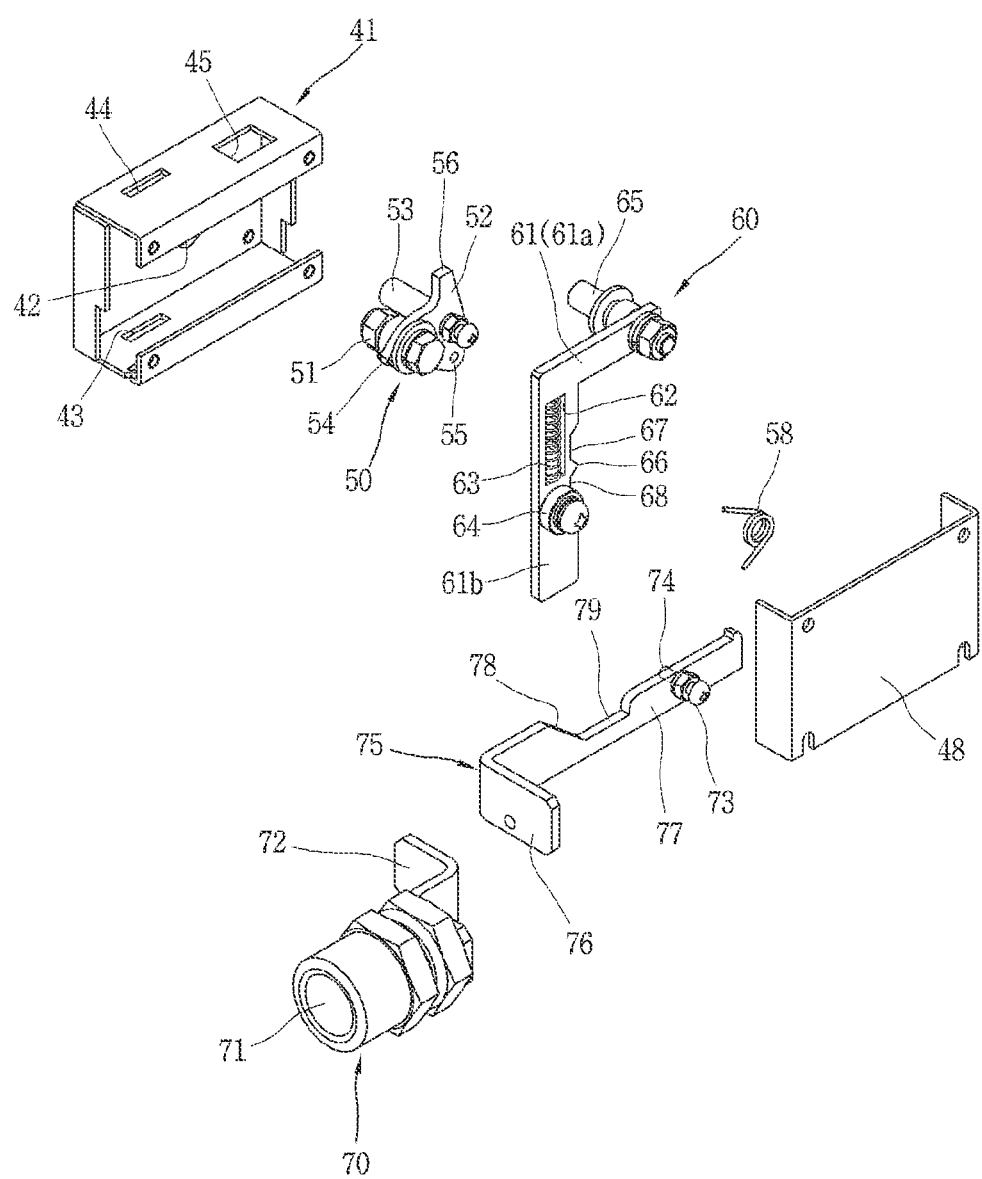
FIG. 11 is an exploded view of the locking device of FIG. 9.

FIGS. 9 to 11 illustrate a locking device and a positioning bracket used in an electric device unit according to an implementation of the present disclosure.

The positioning bracket 30 may be formed as a flat plate. The positioning bracket 30 may be made of a material having high strength such as iron.

A plurality of coupling holes 31 are defined in the positioning bracket 30 so as to allow the positioning bracket 30 to be coupled to the panel or frame 99 of the enclosure 100. Secure coupling can be achieved by the plurality of coupling holes 31, and relative position adjustment in the enclosure 100 can be made by the plurality of coupling holes 31.

A concave and convex part (32a to 34b) is formed on a lower surface of the positioning bracket 30. The concave and convex part (32a to 34b) may include a first convex portion 32a, a first concave portion 32b, a second convex portion 33a, a second concave portion 33b, a third convex portion 34a, and a third concave portion 34b sequentially formed from one side (for example, the front side of the enclosure, namely, the door side of an MCC unit). Here, the first concave portion 32b, the second concave portion 33b, and the third concave portion 34b may correspond to the disconnect position, the test position, and the service position, respectively. When the electric device unit 10 is drawn in and out of the enclosure 100, the locking device 40 moves along the positioning bracket 30. At this time, the indicator 53 of the locking device 40 moves up and down while sliding along the concave and convex part (32a to 34b) of the positioning bracket 30.

Here, the convex portions and the concave portions are formed alternately. For example, the convex portions and the concave portions are formed in the order of the first convex portion 32a, the first concave portion 32b, the second convex portion 33a, the second concave portion 33b, the third convex portion 34a, and the third concave portion 34b.

Also, adjacent convex and concave portions or concave and convex portions are connected by inclined surfaces or curved surfaces. Accordingly, the indicator 53 moves up and down while sliding along the convex portions and the concave portions.

A position of the indicator 53 at the concave and convex part (32a to 34b) allows a user to visually recognize a position of the electric device unit 10. Although not illustrated, the position of the indicator 53 may be sensed and displayed outside of the enclosure 100, such that the user can accurately recognize the position of the electric device unit 10.

Entry part (37, 38) formed as an inclined or curved surface is defined at one end (front end) of the positioning bracket 30. The entry part (37, 38) is formed adjacent to the first convex portion 32a. When viewed from the front, the entry part (37, 38) includes a lower entry portion 37 inclined downward and an upper entry portion 38 inclined upward.

A locking part (35, 36) is formed at an upper surface of the positioning bracket 30. The locking part (35, 36) includes a test position locking groove 35 and a service position locking groove 36. The test position locking groove 35 and the service position locking groove 36 correspond to the test position and the service position, respectively.

The locking device 40 is provided. The locking device 40 may be fixedly installed at one side surface of the unit frame 11. When the electric device unit 10 is drawn in an out of the enclosure 100, the locking device 40 inhibits or allows movement of the electric device unit 10 according to a set position while sliding along the positioning bracket 30.

The locking device 40 includes a case (41, 48) having a box shape, a lower locking member 50 rotatably installed in the case (41, 48) to slide along the lower surface of the positioning bracket 30 when the electric device unit 10 is drawn in and out of the enclosure 100, an upper locking member 60 installed in the case (41, 48) to be movable linearly (movable up and down) so as to slide along the upper surface of the positioning bracket 30 when the electric device unit 10 is drawn in and out of the enclosure 100, a release plate 75 installed at the case (41, 48) to be movable linearly in a direction orthogonal to a movement direction (the same direction as an entry and exit (or in and out) direction of the electric device unit) of the upper locking member 60 so as to release locking of the upper locking member 60, and an operation (or actuating) member 70 for operating the release plate 75.

The case (41, 48) may have a box shape. The case (41, 48) may be configured to be divided into a first case 41 defining one side thereof and a second case 48 defining another side thereof. The first case 41 may have an upper surface and a lower surface.

Operation holes 44 and 43 through which a portion of the upper locking member 60 vertically moves may be formed on the upper and lower surfaces of the first case 41, respectively.

An insertion hole 45 in which a portion of the upper locking member 60 is inserted may be formed on the upper surface of the first case 41.

An indicator hole 42 with an arcuate shape is formed on a side surface of the first case 41 so that the indicator 53 of the lower locking member 50 is installed in a penetrating manner to be operated.

The upper locking member 60 includes a body plate 61 having a vertical portion 61b and a horizontal portion 61a formed in a '¬' shape, a spring hole 62 formed on the vertical portion 61b, a first spring 63 installed in the spring hole 62, a stopping portion 64 protruding from a portion of the vertical portion 61b, and a locking protrusion 65 fixed to a portion of the horizontal portion 61a.

The body plate 61 is inserted into the operation holes 44 and 43 of the first case 41 to be movable up and down. The horizontal portion 61a of the body plate 61 may be exposed to an upper portion of the first case 41.

The first spring 63 is installed in the spring hole 62 of the body plate 61. An upper end portion of the first spring 63 is caught on the upper surface of the first case 41. A lower end of the first spring 63 is caught on a fixing protrusion (no reference numeral) formed on a lower part of the spring hole 62. Since the case (41, 48) is fixed to the electric device unit 10, a downward force is exerted on the upper locking member 60 by an elastic force of the first spring 63. Here, the first spring 63 may be configured as a coil spring.

The stopping portion 64 is provided at the vertical portion 61b of the body plate 61. The stopping portion 64 may be formed in a protruding manner such as a protrusion. The stopping portion 64 may be disposed below the spring hole 62. When the release plate 75 pushes the stopping portion 64 up, the upper locking member 60 moves upward.

The locking protrusion 65 is provided at the horizontal portion 61a of the body plate 61. The locking protrusion 65 may be configured as a pin. When the locking protrusion 65 is engaged or caught in the locking part (35, 36), the locking device 40 is locked to thereby inhibit or limit movement.

A first stopping protrusion 66 that limits movement of the lower locking member 50 is formed on one side of the vertical portion 61b of the body plate 61 in a protruding manner. The first stopping protrusion 66 may have a triangle shape.

An upper groove 67 and a lower groove 68 through which a second stopping protrusion 54 moves may be respectively formed at upper and lower portions of the vertical portion 61b of the body plate 61 adjacent to the first stopping protrusion 66.

The lower locking member 50 includes a stopping plate 52, a rotating shaft 51 provided at one portion of the stopping plate 52, and the indicator 53 provided at another portion of the stopping plate 52.

The stopping plate 52 may be formed as a flat plate. The stopping plate 52 may have a triangular shape. That is, the stopping plate 52 may have three corners or corner portions.

The second stopping protrusion 54 is formed at one corner of the stopping plate 52. The second stopping protrusion 54 may have a triangle shape. When the second stopping protrusion 54 is caught in the first stopping protrusion 66, rotation of the stopping plate 52 may be inhibited.

In addition, the rotating shaft 51 is provided at one corner (first corner) of the stopping plate 52. The stopping plate 52 may rotate centered on the rotating shaft 51. That is, the lower locking member 50 may rotate based on the rotating shaft 51. Since the rotating shaft 51 is provided at one corner side of the stopping plate 52, namely, formed eccentrically, the lower locking member 50 receives a force leaning or sagging (rotating) to one side due to self-weight or load. That is, a portion where the indicator 53 of the locking member 50 is located receives the sagging force.

A spring fixing hole 55 may be formed at another corner (second corner) of the stopping plate 52. A second spring 58 may be installed in the spring fixing hole 55. A force rotating in one direction (e.g., a counterclockwise direction with respect to the rotating shaft, or an upward movement direction of the indicator) is exerted on the stopping plate 52, namely, the lower locking member 50 by the second spring 58.

A lift prevention portion 56 may be formed at the other corner (third corner) of the stopping plate 52. The lift prevention portion 56 is caught on an upper surface of the case (41, 48) to limit (set) a range of upward rotation of the lower locking member 50.

The release plate 75 may be formed as a long and straight flat plate. One end portion of the release plate 75 may be bent to define a coupling portion 76 to which the operation member 70 is coupled. Another end portion of the release plate 75 extends to define an extended portion 77.

A release portion 78 formed as an inclined surface is provided on an upper surface of the release plate 75. When the release plate 75 moves and passes the stopping portion 64, the stopping portion 64 is brought into contact with the inclined surface of the release plate 78 to receive a force. As the upper locking member 60 is locked (or constrained) by the operation holes 44 and 43, the upper locking member 60 may only move in an up-and-down (or vertical) direction, and accordingly, a horizontal force of the forces transferred to the upper stopping portion 64 from the release portion 78 is consumed by friction, and a vertical force is only applied to cause the upper locking member 60 to move upward.

An insertion groove 79 is formed on the upper surface of the release plate 75 adjacent to the release portion 78. The insertion groove 79 serves to prevent interference between the stopping portion 64 of the upper locking member 60 and the release plate 75, and to limit a range of downward movement of the upper locking member 60.

A stopper 74 is provided at one side of the extended portion 77 of the release plate 75 in a protruding manner. The stopper 74 inhibits movement of the stopping plate 52 to thereby limit a range of downward rotation of the lower locking member 50.

A spring mounting portion 73 is formed at another side of the extended portion 77 of the release plate 75 in a protruding manner. One end of the second spring 58 is installed at the spring mounting portion 73.

The second spring 58 is installed between the release plate 75 and the lower locking member 50. The second spring 58 may be configured as a tension spring. The second spring 58 exerts a force to cause the lower locking member 50 to move upward.

The operation member 70 is exposed to an outside of the front door 14 to push the release plate 75 by a force of the user to release locking of the locking device 40. The operation member 40 includes a push button 71 exposed to the outside of the front door 14 and a transmission member 72 coupled to a rear portion of the push button 71. The transmission member 72 has one end coupled to the rear portion of the push button 71 and another end coupled to the coupling portion 76 of the release plate 75 to transfer a force of pushing the release plate 75 rearward in response to the user's manipulation.

When the electric device unit 10 is drawn in or drawn out of the enclosure 100, the locking device 40 may allow or inhibit movement of the electric device unit 10 while sliding along the positioning bracket 30.

With further reference to FIGS. 12 to 21, how the distributing board having the position locking device according to an implementation of the present disclosure works will be described. For the sake of understanding, the first case 41 is not illustrated in FIGS. 12 to 21.

First, a process in which the electric device unit 10 moves from the withdrawal position as shown in FIG. 8 to the service position as shown in FIG. 5 will be described.

Figure 12:
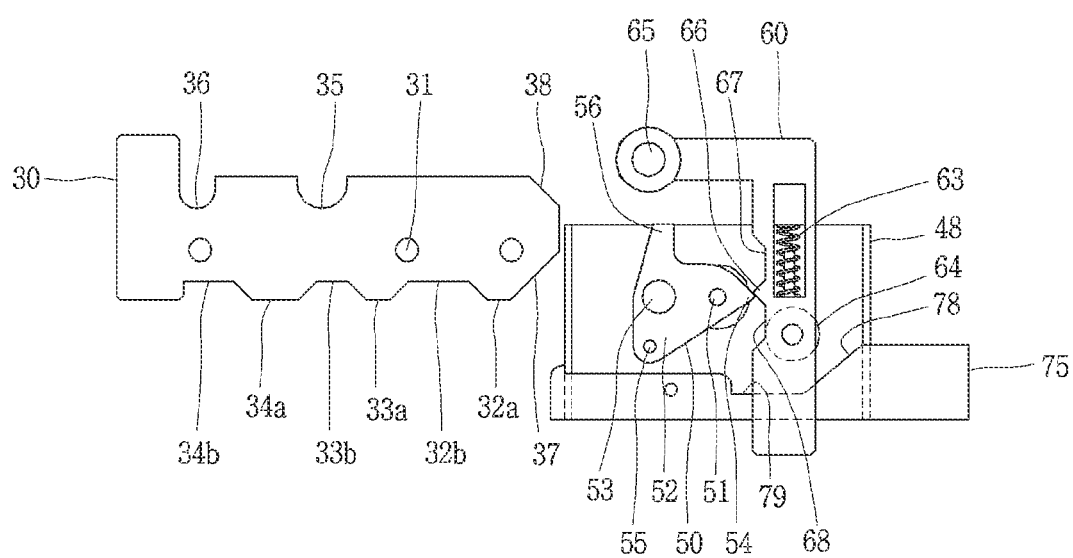
FIGS. 12 to 21 are views for explaining operation of a distributing board having a position locking device according to an implementation of the present disclosure. The state of the locking device for each position is illustrated.

FIG. 12 illustrates the locking device 40 and the positioning bracket 30 in a state in which the electric device unit 10 is in the withdraw position. The locking device 40 is completely separated from the positioning bracket 30.

Here, the lower locking member 50 is in an elevated position by an upward force exerted by the second spring 58 (not shown in FIGS. 12 to 21). The lift prevention portion 56 is in contact with the upper surface of the case (41, 48) as the lower locking member 50 rotates counterclockwise with respect to the rotating shaft 51 in the drawing.

Meanwhile, a downward force is exerted on the upper locking member 60 by an elastic force of the first spring 63. Here, the upper locking member 60 is constrained by the lower locking member 50. That is, in a state where the first stopping protrusion 66 of the upper locking member 60 is in contact with an upper surface of the second stopping protrusion 54 of the lower locking member 50, movement of the upper locking member 60 is inhibited. The upper locking member 60 is placed at a position where the first stopping protrusion 66 is in contact with the upper surface of the second locking protrusion 54.

Figure 13:
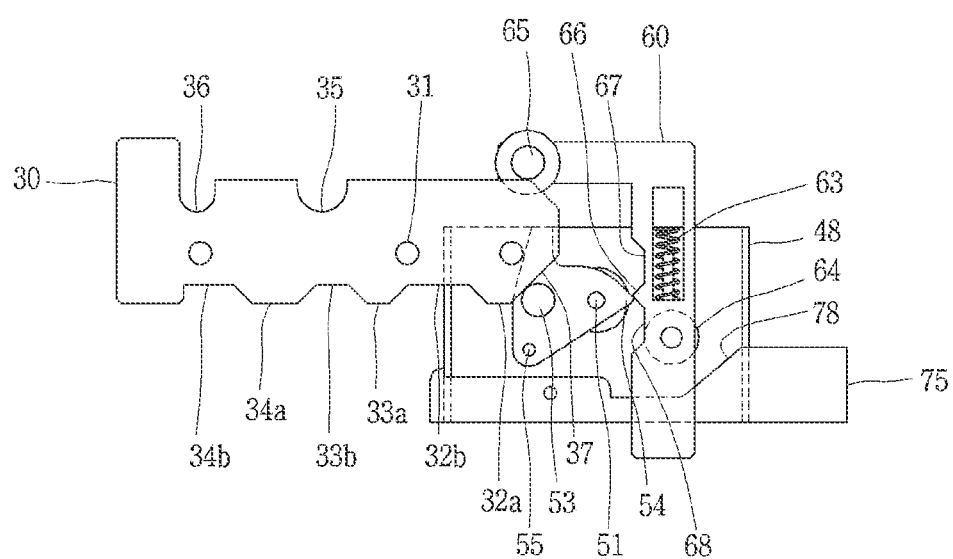
Figure 14:
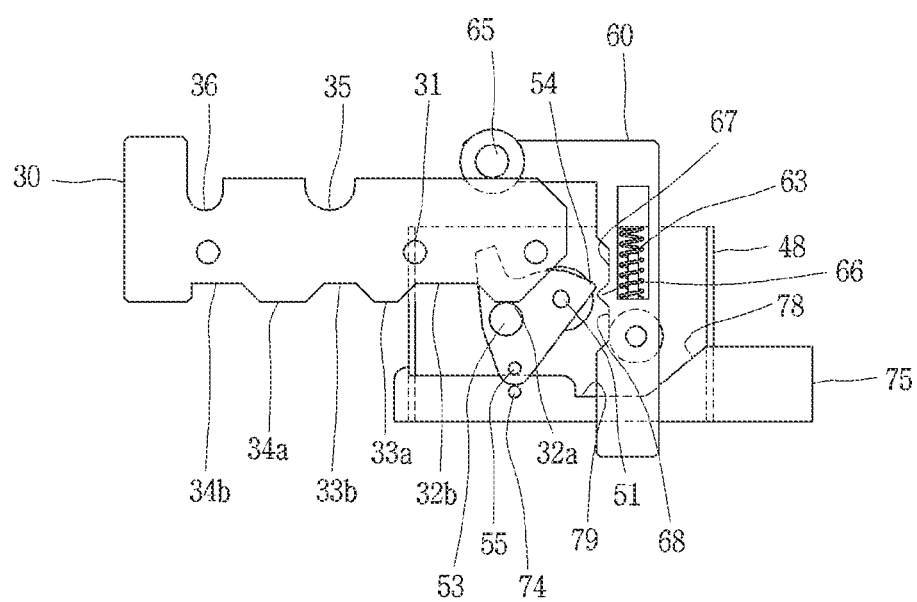

FIGS. 13 and 14 illustrate a state in which the electric device unit 10 enters (moves) between the withdraw position and the disconnect position.

When the electric device unit 10 is drawn in the enclosure 100, the locking protrusion 65 of the upper locking member 60 is brought into contact with the upper entry portion 38 of the positioning bracket 30 as illustrated in FIG. 13. As the upper entry portion 38 is inclined upward with respect to an entry direction of the electric device unit 10, the upper locking member 60 moves upward as the electric device unit 10 enters further into the enclosure 100. In the withdrawal state, when a height of the locking protrusion 65 is the same as the upper surface of the positioning bracket 30, the upper locking member 60 does not come in contact with the upper entry portion 38.

Meanwhile, the indicator 53 of the lower locking member 50 is brought into contact with the lower entry portion 37. As the lower entry portion 37 is inclined downward with respect to the entry direction of the electric device unit 10, the indicator 53 moves downward along the lower entry portion 37, and the lower locking member 50 rotates counterclockwise with respect to the rotating shaft 51.

As illustrated in FIG. 14, when the electric device unit 10 moves (enters) further from the position of FIG. 13, the indicator 53 of the lower locking member 50 passes the first convex portion 32a of the positioning bracket 30. (Since an upward force is exerted on the lower locking member 50 by an elastic force of the second spring 58, the indicator 53 moves while sliding along the lower surface of the positioning bracket 30). At this time, the second corner of the lower locking member 50 is brought into contact with the stopper 74 of the release plate 75 to thereby inhibit downward rotation (rotation in the counterclockwise direction in the drawing) of the lower locking member 50. The second stopping protrusion 54 of the lower locking member 50 moves above the first stopping protrusion 66 of the upper locking member 60 to be located in a region or area of the upper groove 67. The second stopping protrusion 54 makes a clicking sound when passing over (or crossing) the first stopping protrusion 66, allowing the user to audibly recognize a change in position.

Meanwhile, the locking protrusion 65 of the upper locking member 60 moves along the upper surface of the positioning bracket 30 in a contact state. (Since a downward force is exerted on the upper locking member 60 by an elastic force of the first spring 63, the locking protrusion 65 moves while sliding along the upper surface of the positioning bracket 30) Here, as the first stopping protrusion 66 is deviated or separated from the second locking protrusion 54, the upper locking member 60 is released from the constraint of the lower locking member 50 to thereby receive only a force of the first spring 63, causing the upper locking member 60 to move while being in close contact with the upper surface of the bracket 30.

Figure 15:
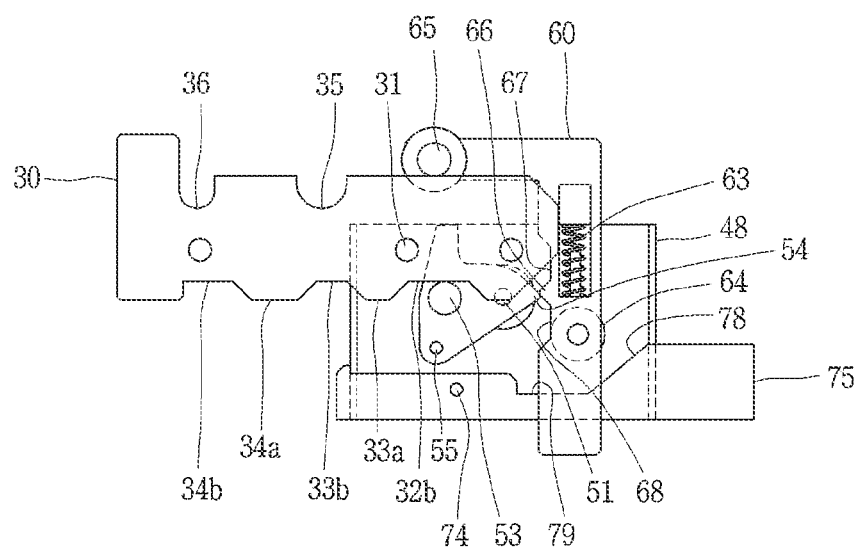

FIG. 15 illustrates a state in which the electric device unit 10 is in the disconnect position. The indicator 53 of the lower locking member 50 passes the first concave portion 32b of the positioning bracket 30. The lower locking member 50 is rotated upward (clockwise) by a force of the second spring 58, such that the indicator 53 is brought into contact with the first concave portion 32b. At this time, the second stopping protrusion 54 is in contact with a lower surface of the first stopping protrusion 66 after passing the first locking protrusion 66.

Figure 16:
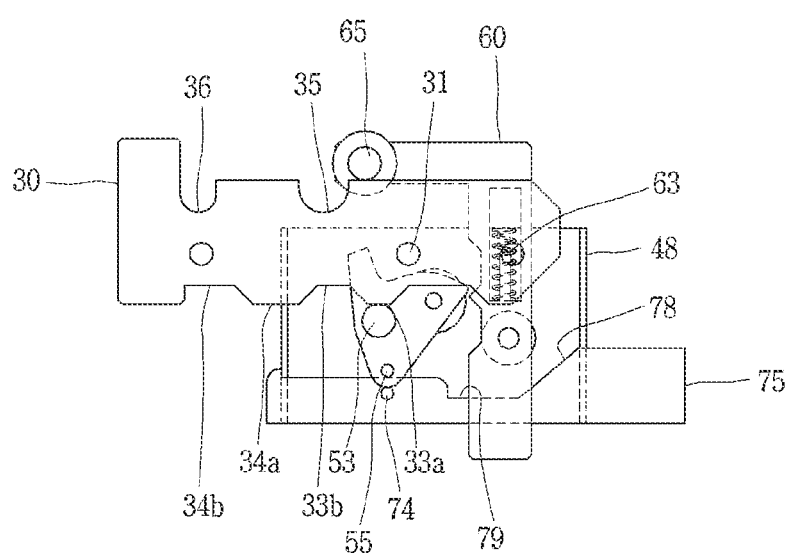

FIG. 16 illustrates a state in which the electric device unit 10 enters (moves) between the disconnect position and the test position.

As illustrated in FIG. 16, when the electric device unit 10 enters further into the enclosure 100, the indicator 53 of the lower locking member 50 passes the second convex portion 33a of the positioning bracket 30. Here, the second corner of the lower locking member 50 is brought into contact with the stopper 74 of the release plate 75 to thereby inhibit downward rotation (rotation in the counterclockwise direction) of the lower locking member 50. At this time, the second stopping protrusion 54 of the lower locking member 50 located above the first stopping protrusion 66 of the upper locking member 60. That is, the second stopping protrusion 54 is located in the upper groove 67 area. The second stopping protrusion 54 makes a clicking sound when passing over the first stopping protrusion 66, allowing the user to audibly recognize a change in position.

Meanwhile, the locking protrusion 65 of the upper locking member 60 moves along the upper surface of the positioning bracket 30 in a contact state. The upper locking member 60 is released from the constraint of the lower locking member 50 to thereby receive only a force of the first spring 63, causing the upper locking member 60 to move while being in close contact with the upper surface of the positioning bracket 30.

Figure 17:
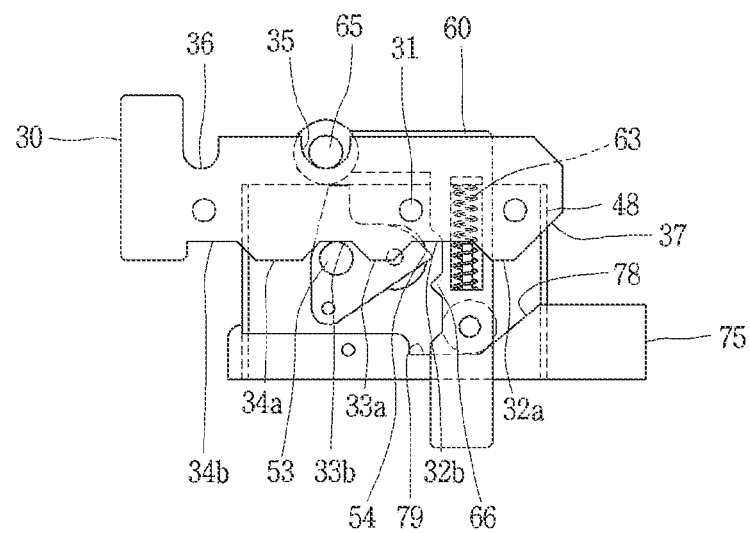

FIG. 17 illustrates a state in which the electric device unit 10 is in the test position. Here, movement of the electric device unit 10 is inhibited.

The indicator 53 of the lower locking member 50 passes the second concave portion 33b of the positioning bracket 30. The lower locking member 50 rotates upward (clockwise) by receiving a force of the second spring 58, such that the indicator 53 is in contact with the second concave portion 33b.

As the locking protrusion 65 of the upper locking member 60 is located in the test position locking groove 35 of the positioning bracket 30, the upper locking member 60 is moved downward by an elastic force of the first spring 63 to allow the locking protrusion 65 to be inserted into the test position locking groove 35. Here, the stopping portion 64 of the upper locking member 60 may be disposed at a position in contact with the insertion groove 79 of the release plate 75. Meanwhile, since the upper locking member 60 has moved downward, the second stopping protrusion 54 maintains to be disposed in the upper groove 67 area.

As the locking protrusion 65 of the upper locking member 60 is inserted into the test position locking groove 35 of the positioning bracket 30, movement (front-and-rear direction) of the electric device unit 10 is inhibited. Accordingly, the test state of the electric device unit 10 is securely maintained. The user can check or recognize that the electric device unit 10 is properly located at the test position by seeing that the electric device unit 10 is not moved back and forth.

Figure 18:
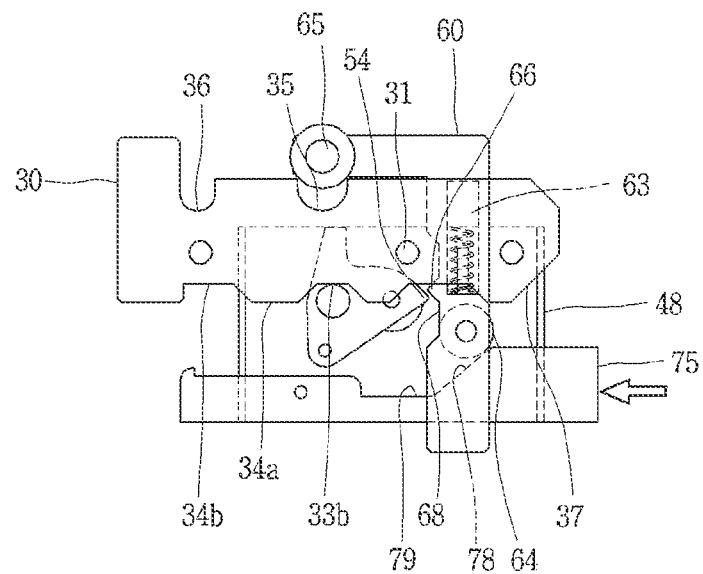

FIG. 18 illustrates unlocking of the locking device 40 by a user to move the electric device unit 10 locked in the test position.

When the user presses the operation member 70 to move the release plate 75 in an inward direction (entry direction), the release portion 78 is brought into contact with the stopping portion 64 of the upper locking member 60 to apply a force. The upper locking member 60 is moved upward by the inclined surface of the release portion 78. When the locking protrusion is deviated from the test position locking groove 35 as the upper locking member 60 moves, movement of the electric device unit 10 is allowed.

Here, the first stopping protrusion 66 of the upper locking member 60 makes a sound while passing over the second stopping protrusion 54 of the lower locking member 50, and the second stopping protrusion 54 is disposed in an area of the lower groove 68.

Figure 19:
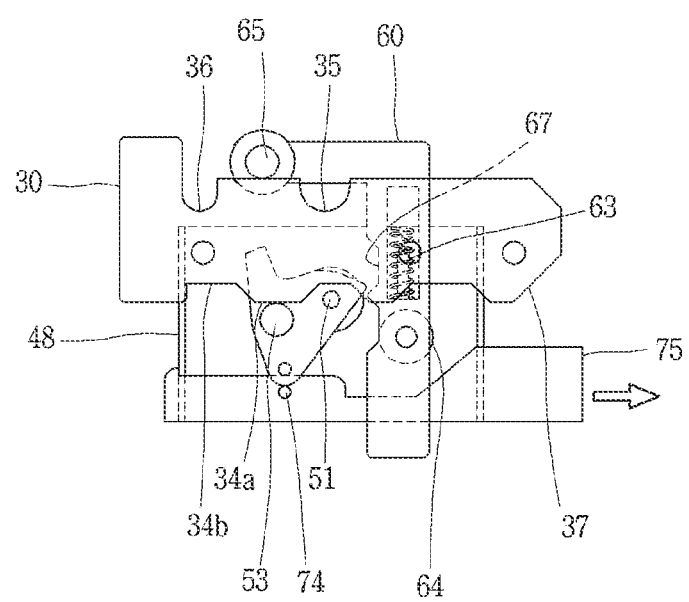

FIG. 19 illustrates the electric device unit 10 entering (moving) between the test position and the connect position. When the electric device unit 10 moves further into the enclosure 100, the indicator 53 of the lower locking member 50 passes the third convex portion 34a of the positioning bracket 30. Here, the second corner of the lower locking member 50 is brought into contact with the stopper 74 of the release plate 75 to limit downward rotation (rotation in the counterclockwise direction) of the lower locking member 50. At this time, the second stopping protrusion 54 of the lower locking member 50 is located above the first stopping protrusion 66 of the upper locking member 60. That is, the second stopping protrusion 54 is located in the upper groove 67 area. The second stopping protrusion 54 makes a clicking sound while passing over the first stopping protrusion 66, allowing the user to audibly recognize a change in position.

Meanwhile, the locking protrusion 65 of the upper locking member 60 moves along the upper surface of the positioning bracket 30 in a contact state. The upper locking member 60 is released from the constraint of the lower locking member 50 to thereby receive only a force of the first spring 63, causing the upper locking member 60 to move while being in close contact with the upper surface of the positioning bracket 30.

Here, the operation member 40 that has been pressed to unlock the upper locking member 60 is returned to its original position by a return spring (not shown).

Figure 20:
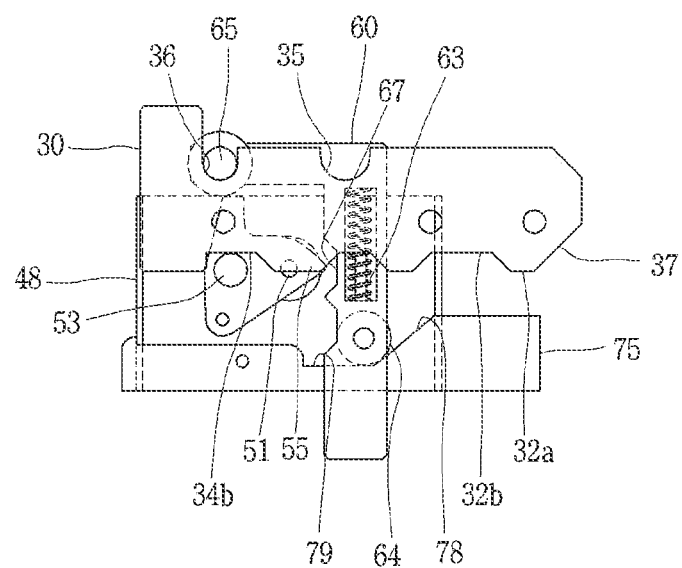

FIG. 20 illustrates a state in which the electric device unit 10 is in the service position. At this time, movement of the electric device unit 10 is inhibited.

The indicator 53 of the lower locking member 50 passes the third concave portion 34b of the positioning bracket 30. The lower locking member 50 rotates upward (clockwise) by a force of the second spring 58 to cause the indicator 53 to be in contact with the second concave portion 33b.

As the locking protrusion 65 of the upper locking member 60 is located in the service position locking groove 36 of the positioning bracket 30, the upper locking member 60 is moved downward by an elastic force of the first spring 63, allowing the locking protrusion 65 to be inserted into the service position locking groove 36. Here, the stopping portion 64 of the upper locking member 60 may be disposed at a position in contact with the insertion groove 79 of the release plate 75. Meanwhile, as the upper locking member 60 has moved downward, the second stopping protrusion 54 maintains to be disposed in the upper groove 67 area.

As the locking protrusion 65 of the upper locking member 60 is inserted into the service position locking groove 36 of the positioning bracket 30, movement (front-and-back direction) of the electric device unit 10 is inhibited. Accordingly, the electric device unit 10 is securely maintained in the service state (current conducting state). The user can check that the electric device unit 10 is properly located at the service position by seeing that the electric device unit 10 is not moved back and forth.

As the locking protrusion 65 of the upper locking member 60 is located in the service position locking groove 36 of the positioning bracket 30, the upper locking member 60 is moved downward by the first spring 63. Since the upper locking member 60 has moved downward, the second stopping protrusion 54 maintains to be disposed in the upper groove 67.

Figure 21:
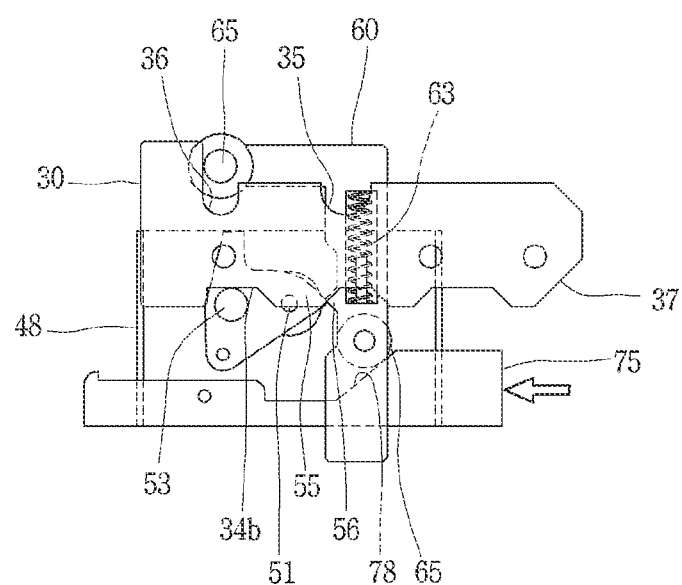

FIG. 21 illustrates unlocking of the locking device 40 by the user to move the electric device unit 10 locked in the service position.

When the user presses the operation member 40 to move the release plate 75 in the inward direction (entry direction), the release portion 78 is brought into contact with the stopping portion 64 of the upper locking member 60 to apply a force. The upper locking member 60 is moved upward by the inclined surface of the release portion 78. When the locking protrusion 65 is deviated from the service position locking groove 36 as the upper locking member 60 moves, movement of the electric device unit 10 is allowed.

Here, the first stopping protrusion 66 of the upper locking member 60 makes a sound while passing over the second stopping protrusion 54 of the lower locking member 50, and the second stopping protrusion 54 is disposed in the lower groove 68 area.

Next, a withdrawal process of moving the electric device unit 10 from the service position to the withdrawal position will be described.

This process is carried out in the reverse order of the process described above, so a detailed description thereof will be omitted. When describing the withdrawal process in the order of the drawings, it can be carried out sequentially from the service position of FIG. 20→unlocking of the service position of FIG. 21→moving from the service position to the test position of FIG. 19→test position of FIG. 17→unlocking of the test position of FIG. 18→moving from the test position to the disconnect position of FIG. 16→disconnect position of FIG. 15→moving from the disconnect position to the withdrawal position of FIG. 14→withdrawal position of FIG. 13→withdrawal completion of FIG. 12.

In the distributing board having the position locking device according to the implementations of the present disclosure, the electric device unit can be locked or unlocked to or from a set position, such as the test position and the service position, allowing stable operation to be maintained.

In addition, incomplete connection due to non-driving or damage to parts due to over-driving can be prevented.

As a sound is generated by contact of the locking protrusions when there is a change in position or locking is released, the user can audibly recognize the change in position.

As the position of the indicator is sensed and displayed externally, the position of the electric device unit can be easily recognized.

While the disclosure has been shown and described with reference to the foregoing preferred implementations thereof, it will be understood by those skilled in the art that various changes and modifications may be made without departing from the spirit and scope of the disclosure as defined by the appended claims. Therefore, the implementations disclosed in the present disclosure are not intended to limit the scope of the present disclosure but are merely illustrative, and it should be understood that the scope of the technical idea of the present disclosure is not limited by those implementations. That is, the scope of protection of the present disclosure should be construed according to the appended claims, and all technical ideas within the scope of equivalents thereof should be construed as being included in the scope of the present disclosure.

The invention claimed is:

1. A distributing board having a position lock device comprising:
   an enclosure and an electric device unit configured to be drawn in and out of the enclosure,
   a positioning bracket having;
     a concave and convex part fixed to the enclosure and configured to set a position of the electric device unit, the concave and convex part includes a plurality of convex portions and concave portions formed alternately, wherein the plurality of concave portions and concave portions include a first convex portion, a first concave portion, a second convex portion, a second concave portion, a third convex portion, and a third concave portion sequentially formed from one end of the positioning bracket, and wherein the first concave portion, the second concave portion, and the third concave portion correspond to a disconnect position, a test position, and a service position of the electric device unit, respectively, and wherein adjacent ones of the convex and concave portions of the plurality of concave portions and concave portions are connected by an inclined surface, and a test position looking groove corresponding to the test position and a service position locking groove corresponding to the service position are formed on an upper surface of the positioning bracket; and a locking device coupled to a portion of the electric device unit to move together with the electric device unit, and configured to be locked or unlocked to or from each position of the positioning bracket so as to inhibit or allow movement of the electric device unit.

2. A distributing board having a position lock device comprising:

an enclosure and an electric device unit configured to be drawn in and out of the enclosure, a positioning bracket having a concave and convex part fixed to the enclosure and configured to set a position of the electric device unit; and a locking device coupled to a portion of the electric device unit to move together with the electric device unit, and configured to be locked or unlocked to or from each position of the positioning bracket so as to inhibit or allow movement of the electric device unit, wherein the locking device includes:

a case;

an upper locking member installed at the case to be movable up and down, so as to slide along an upper surface of the positioning bracket when the electric device unit is drawn in and out of the enclosure;

a lower locking member rotatably installed at the case to slide along a lower surface of the positioning bracket when the electric device unit is drawn in and out of the enclosure; and a release plate installed on the case to move linearly in a direction orthogonal to a movement direction of the upper locking member, so as to release locking of the upper locking member, wherein an indicator hole having an arcuate shape is formed on a side surface of the case, the indicator hole configured for viewing an indicator of the lower locking member; and an operation member that provides a force for operating the release plate, wherein operation holes are formed on upper and lower surfaces of the case, respectively, so as to allow a portion of the upper locking member to move up and down.

3. The distributing board of claim 2, wherein the upper locking member includes:

a body plate having a vertical portion and a horizontal portion;

a spring hole defined in the vertical portion;

a first spring installed in the spring hole;

a stopping portion protruding from a portion of the vertical portion; and a locking protrusion fixed to a portion of the horizontal portion.

4. The distributing board of claim 3, wherein the first spring has an upper end portion caught on an upper surface of the case to provide an elastic force for causing the upper locking member to move downward.

5. The distributing board of claim 3, wherein a first stopping protrusion that limits movement of the lower locking member or the upper locking member is provided at one side of the vertical portion in a protruding manner.

6. The distributing board of claim 5, wherein upper and lower grooves are respectively formed on upper and lower portions of the vertical portion adjacent to the first stopping protrusion.

7. The distributing board of claim 5, wherein the lower locking member includes:

a stopping plate;

a rotating shaft provided at one portion of the stopping plate; and an indicator provided at another portion of the stopping plate.

8. The distributing board of claim 7, wherein the stopping plate is formed as a flat plate having a first corner, a second corner, and a third corner, and wherein a second stopping protrusion that is brought into contact with or separated from the first stopping protrusion and the rotating shaft that serves as a rotation center of the lower locking member are provided at the first corner.

9. The distributing board of claim 8, wherein a spring fixing hole in which a second spring providing an elastic force for causing the lower locking member to move upward is formed at the second corner.

10. The distributing board of claim 9, wherein a lift prevention portion that limits upward movement of the lower locking member is formed at the third corner.

11. The distributing board of claim 9, wherein another end of the release plate extends to define an extended portion, and a stopper that limits downward movement of the stopping plate is provided at one side of the extended portion in a protruding manner.

12. The distributing board of claim 11, wherein a release portion formed as an inclined surface is provided on an upper surface of the release plate so that the upper locking member is moved upward when the release portion is brought into contact with the stopping portion.

13. The distributing board of claim 12, wherein an insertion groove is formed on the upper surface of the release plate adjacent to the release portion to prevent interference of the stopping portion.

14. The distributing board of claim 2, wherein one end portion of the release plate is bent to define a coupling portion to which the operation member is coupled.

* * * * *